(12) United States Patent
Kitanaka et al.

(10) Patent No.: US 7,268,540 B1
(45) Date of Patent: Sep. 11, 2007

(54) ROTATIONAL ANGLE DETECTOR

(75) Inventors: Tatsuya Kitanaka, Nagoya (JP); Takashi Kawashima, Nagoya (JP); Koichiro Matsumoto, Kariya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/702,152

(22) Filed: Feb. 5, 2007

(30) Foreign Application Priority Data

Feb. 14, 2006 (JP) .............................. 2006-036201

(51) Int. Cl.
*G01B 7/30* (2006.01)
(52) U.S. Cl. ................................. 324/207.25
(58) Field of Classification Search ........... 324/207.25, 324/173–174; 73/514.31, 514.39
See application file for complete search history.

(56) References Cited

FOREIGN PATENT DOCUMENTS

| JP | 62-95402 | 5/1987 |
|---|---|---|
| JP | 10-141993 | 5/1998 |

*Primary Examiner*—Bot LeDynh
(74) *Attorney, Agent, or Firm*—Nixon & Vanderhye P.C.

(57) ABSTRACT

Conductive wires run parallel to each other and connect a Hall element and an ECU. The conductive wire includes an extracting part and a wiring part. The extracting part runs along a surface of a base, on which the Hall element is positioned, and in a direction of a sensitivity of the Hall element. The wiring part extends from the extracting part and runs near a rotating crankshaft in an axial direction of the crankshaft. Similar to the conductive wire, the conductive wire includes an extracting part and a wiring part. Conductive wires run parallel to each other and connect a Hall element and the ECU. The conductive wires include an extracting part and a wiring part, and an extracting part and a wiring part, respectively.

7 Claims, 7 Drawing Sheets

| Va | Vb | ROTATIONAL ANGLE (deg) |
|---|---|---|
| + | + | 0~90 |
| + | − | 90~180 |
| − | − | 180~270 |
| − | + | 270~360 |

ROTATIONAL ANGLE DETECTOR

CROSS REFERENCE TO RELATED APPLICATION

This application is based on and incorporates herein by reference Japanese Patent Application No. 2006-36201 filed on Feb. 14, 2006.

FIELD OF THE INVENTION

The present invention relates to a rotational angle detector.

BACKGROUND OF THE INVENTION

A rotational angle detector (e.g., JP62-095402A), which detects a rotational angle of an object of detection based on a magnetic field that varies according to rotation of the object of detection, is conventionally proposed. In such a rotational angle detector, a magnetism detecting element (e.g., a Hall element) is rotated relative to a magnetic field generating permanent magnet in synchronization with the rotation of the object. The rotational angle detector thus detects the rotational angle of the object based on an output signal of the magnetism detecting element. The output signal corresponds to a rotating magnetic field, which accompanies the rotation of the permanent magnet relative to the magnetism detecting element.

However, in the above rotational angle detector, inductive noise due to the rotating magnetic field overlaps with the output signal of the magnetism detecting element. The inductive noise is caused by induced electromotive force, which is generated in a circuit formed by conductive wires for transmitting the output signal when the magnetic field varies according to the rotation of the object. As a result, a detection error increases when the rotational angle detector detects the rotational angle.

SUMMARY OF THE INVENTION

The present invention addresses the above disadvantages. Thus, it is an objective of the present invention to provide a rotational angle detector, which has a relatively small detection error due to inductive noise.

To achieve the objective of the present invention, there is provided a rotational angle detector for detecting rotation of a detection object. The rotational angle detector includes a magnetic field generating device, a magnetism detecting element, a pair of conductive wires, and an electronic device. The magnetic field generating device generates a magnetic field. The magnetism detecting element is positioned in the magnetic field and outputs an output signal in correspondence with variation in the magnetic field caused by rotation of the detection object. The pair of conductive wires is connected to the magnetism detecting element and transmits the output signal. The electronic device detects a rotational angle of the detection object based on the output signal. The pair of conductive wires includes a corresponding pair of wiring parts, which run in a virtual plane that is generally perpendicular to a direction of a sensitivity of the magnetism detecting element and extend along a rotational axis of the detection object in an area where the magnetic field is varied by the rotation of the detection object.

BRIEF DESCRIPTION OF THE DRAWINGS

The invention, together with additional objectives, features and advantages thereof, will be best understood from the following description, the appended claims and the accompanying drawings. In the drawings:

DETAILED DESCRIPTION OF THE EMBODIMENT

Embodiments of the present invention will be described below. The same numerals are used to indicate the same or similar components throughout the following description and drawings.

First Embodiment

Figure 1A:
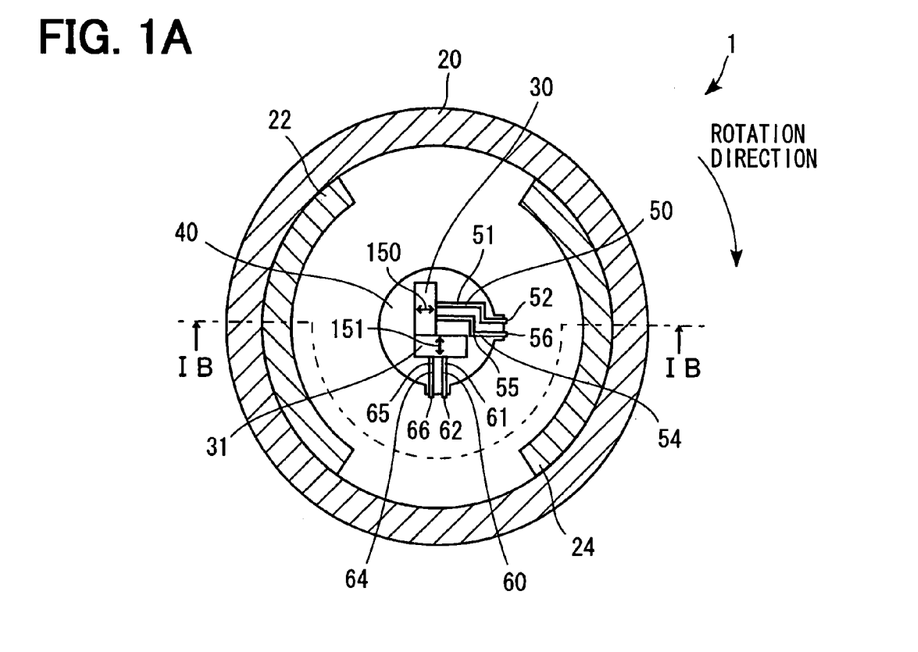
FIG. 1A is a cross-sectional view of a rotational angle detector in FIG. 1B taken along a line IA-IA according to a first embodiment of the present invention.
Figure 1B:
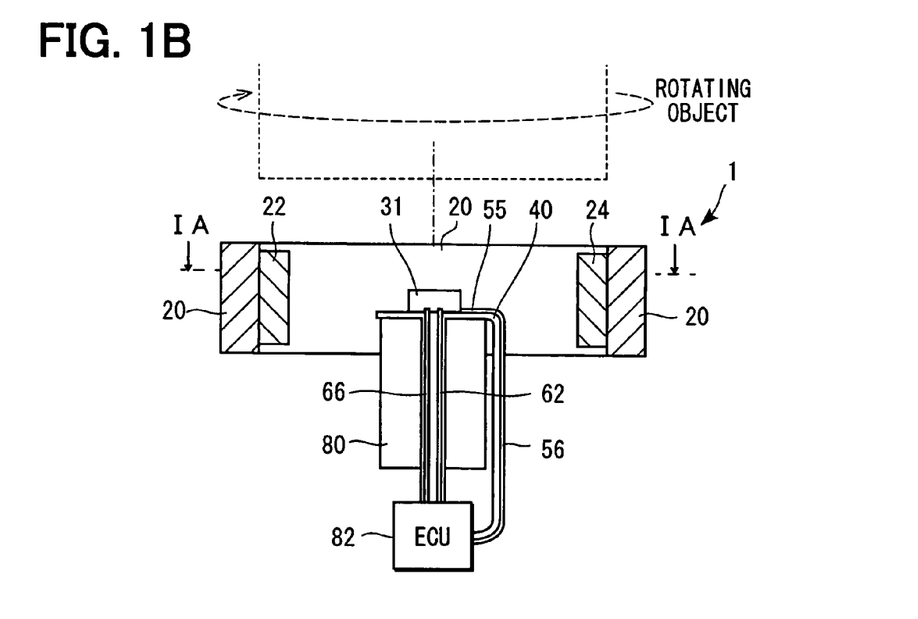
FIG. 1B is a cross-sectional view of the rotational angle detector in FIG. 1A taken along a line IB-IB according to the first embodiment.

Referring first to FIGS. 1A and 1B, a rotational angle detector 1 according to a first embodiment is, for example, a crank angle detector that is installed in an ignition system for an internal combustion engine. The rotational angle detector 1 is provided to output an electrical signal that correlates with an angle (crank angle) of a crankshaft (not shown), which is being detected, to an electronic control unit (ECU) 82 of the internal combustion engine. Then, the ECU 82 (i.e., an electronic means) of the internal combustion engine detects the crank angle based on the electrical signal that is outputted from the rotational angle detector 1, and determines in which cylinder a fuel is to be ignited based on the crank angle that is detected.

The rotational angle detector 1 includes a cylindrical yoke 20, permanent magnets 22, 24, Hall elements 30, 31, a flexible printed circuit board (FPC) 40, a base 80, the ECU 82, and the like.

Figure 2A:
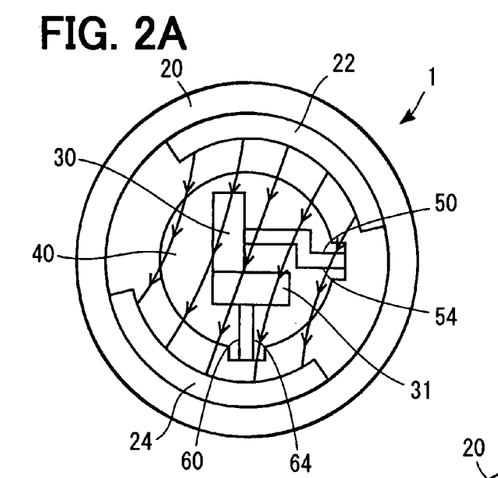
FIG. 2A is a schematic view showing a magnetic field that permanent magnets generate.
Figure 2B:
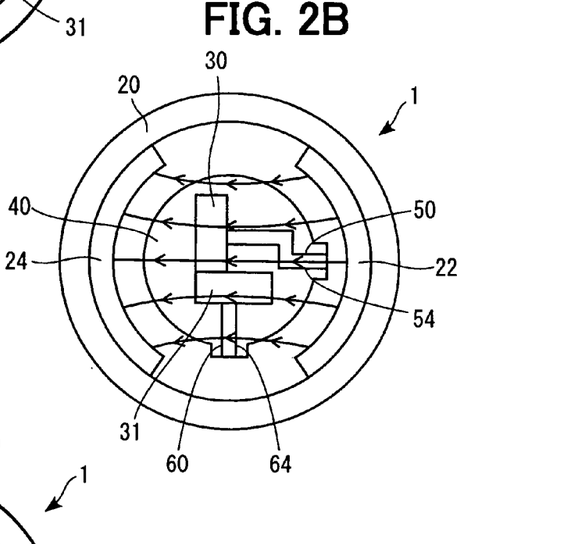
FIG. 2B is a schematic view showing the magnetic field that the permanent magnets generate.
Figure 2C:
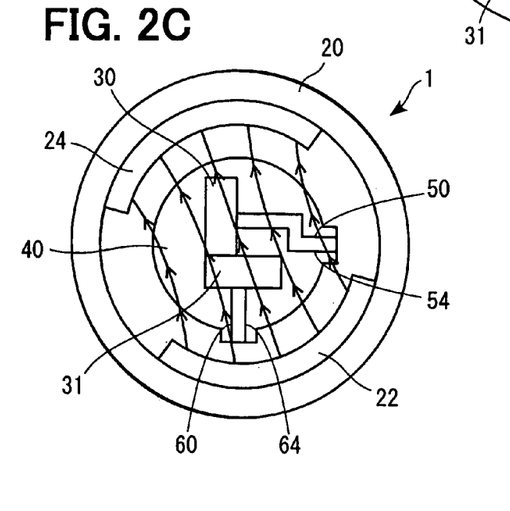
FIG. 2C is a schematic view showing the magnetic field that the permanent magnets generate.

The yoke 20, and the permanent magnets 22, 24 are magnetic field generating means, and rotate with the crankshaft. The arc-shaped permanent magnets 22, 24 are fixed on an inner wall of the yoke 20. The permanent magnets 22, 24 are arranged exactly (180-degree) on the opposite side to each other in the radial direction, and generate a magnetic field near a rotational axis of the crankshaft. As shown in FIGS. 2A to 2C, this nearly parallel magnetic field has a generally uniform magnetic flux density.

The Hall elements 30, 31 (i.e., magnetism detecting elements) are positioned on the base 80 that is fixed and does not rotate with the rotating crankshaft. More specifically, the Hall elements 30, 31 are mounted on the FPC 40, which is fixed on the base 80. Consequently, when the crankshaft rotates, the yoke 20 and the permanent magnets 22, 24 rotate relative to the Hall elements 30, 31. The Hall elements 30, 31 are disposed perpendicular to the rotational direction of the crankshaft and at right angles to each other. In addition, a constant electric current is supplied to the Hall elements 30, 31 via a power supply line (not shown).

As shown in FIG. 1A, the Hall elements 30, 31 are positioned near the rotational axis of the crankshaft. Accordingly, a parallel magnetic field with a uniform magnetic flux density (FIGS. 2A to 2C) is formed near the Hall elements 30, 31 regardless of a rotational angle of the crankshaft. Because of this, the Hall elements 30, 31 can output signals, which are appropriate for the rotational angle of the crankshaft, within a 360-degree range.

The FPC 40 includes conductive wires 50, 54, 60, 64, and the like. The conductive wires 50, 54, 60, 64 are conductive materials such as copper (Cu).

The conductive wires 50, 54 (i.e., a pair of conductive wires) are connected to the Hall element 30, and run parallel to each other. The conductive wires 50, 54 transmit an output signal from the Hall element 30. The conductive wire 50 includes an extracting part 51 and a wiring part 52. The extracting part 51 runs along a surface of the base 80, on which the Hall element 30 is positioned, and in a direction (as indicated by arrows 150 in FIG. 1A) of a sensitivity of the Hall element 30. The wiring part 52 extends from the extracting part 51 and runs near the rotating crankshaft in an axial direction of the crankshaft. Similar to the conductive wire 50, the conductive wire 54 includes an extracting part 55 and a wiring part 56. The extracting part 51 of the conductive wire 50 and the extracting part 55 of the conductive wire 54 run in a virtual plane that is generally parallel to a direction of the magnetic field. The wiring part 52 of the conductive wire 50 and the wiring part 56 of the conductive wire 54 run in a virtual plane that is generally perpendicular to the direction (arrows 150) of the sensitivity of the Hall element 30. Because each of the conductive wires 50, 54 has the extracting and wiring parts, greater flexibility to carry out wiring of the conductive wires 50, 54 is provided, as compared to those conductive wires which do not have the extracting parts.

The conductive wires 60, 64 (i.e., the pair of conductive wires) are connected to the Hall element 31 and run parallel to each other. A distance between the conductive wires 60, 64 is the same as that between the conductive wires 50, 54. The conductive wires 60, 64 transmit an output signal from the Hall element 31. Similar to the conductive wire 50, the conductive wire 60 includes an extracting part 61 and a wiring part 62. The extracting part 61 runs along a surface of the base 80, on which the Hall element 31 is positioned, and in a direction (as indicated by arrows 151 in FIG. 1A) of a sensitivity of the Hall element 31. The wiring part 62 extends from the extracting part 61 and runs near the rotating crankshaft in the axial direction of the crankshaft. Similar to the conductive wire 60, the conductive wire 64 includes an extracting part 65 and a wiring part 66. The extracting part 61 of the conductive wire 60 and the extracting part 65 of the conductive wire 64 run in the virtual plane that is generally parallel to the direction of the magnetic field. The wiring part 62 of the conductive wire 60 and the wiring part 66 of the conductive wire 64 run in the virtual plane that is generally perpendicular to the direction (arrows 151) of the sensitivity of the Hall element 31.

The ECU 82 includes a nonvolatile memory (e.g., a flash memory) that stores a rotational angle detecting program, a volatile memory that temporarily stores the rotational angle detecting program and various pieces of data, a CPU that executes the rotational angle detecting program that is extracted in a volatile memory, and the like.

Figure 3A:
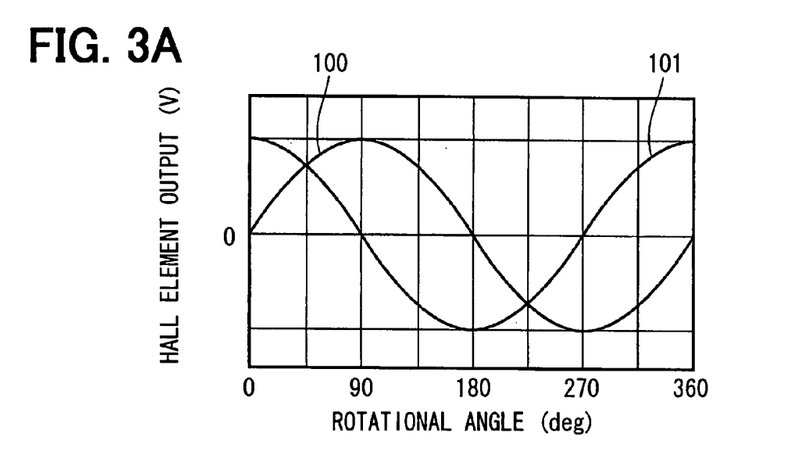
FIG. 3A is a diagram illustrating a method of detecting a rotational angle by the rotational angle detector.

As above, the Hall elements 30, 31 are disposed perpendicular to the rotational direction of the crankshaft and at right angles to each other. Therefore, when the crankshaft rotates, the Hall elements 30, 31 output the signals that have a 90-degree phase difference from each other in response to a change in the magnetic field. More specifically, the Hall elements 30, 31 output sinusoidal signals (i.e., output signals 100, 101, respectively, as shown in FIG. 3A) that have a sine-cosine relationship with each other, as a potential difference between two conductive wires that are connected to the Hall elements 30, 31, respectively. Given the rotational angle (θ) of the crankshaft, the output signal 100 ($V_a$) of the Hall element 30, the output signal 101 ($V_b$) of the Hall element 31, a coefficient (k) that depends upon the sensitivities of the Hall elements 30, 31, the magnetic flux density (B) of the magnetic field formed by the permanent magnets 22, 24, and the constant electric current (I) that is supplied to the Hall elements 30 and 31, $V_a$ and $V_b$ are expressed in the following equations (1) and (2), respectively.

$$V_a = kBI \cdot \sin\theta \tag{1}$$

$$V_b = kBI \cdot \sin(\theta+90) = kBI \cdot \cos\theta \tag{2}$$

The ECU 82 detects the rotational angle (θ) of the crankshaft based on the output signal 100 ($V_a$) that is transmitted via the conductive wires 50, 54, and the output signal 101 ($V_b$) that is transmitted via the conductive wires 60, 64. More specifically, the detection of the rotational angle (θ) is carried out in the ECU 82 by, for example, performing the following processing on the output signals 100, 101. The rotational angle detecting program is executed by the CPU of the ECU 82 to perform the processing. The rotational angle detecting program is constantly executed all the while the rotational angle detector 1 is operating.

Figure 3B:
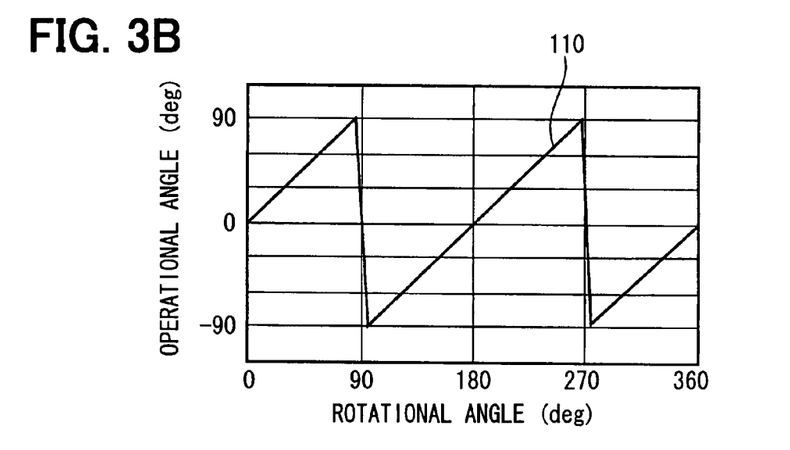
FIG. 3B is a diagram illustrating the method of detecting the rotational angle by the rotational angle detector.

The processing performed by the ECU 82 will be described below. First, the ECU 82 calculates "tan θ" (in the following equation (3)) from a ratio of $V_a$ to $V_b$. Next, arctangent (in the following equation (4)) of the ratio of $V_a$ to $V_b$ is calculated to obtain the rotational angle (θ). A period of a calculated angle 110 (FIG. 3B) that is calculated through such an operation is 180 degrees.

$$V_a/V_b = \sin\theta/\cos\theta = \tan\theta \tag{3}$$

$$\theta = \arctan(V_a/V_b) \tag{4}$$

Figure 3C:
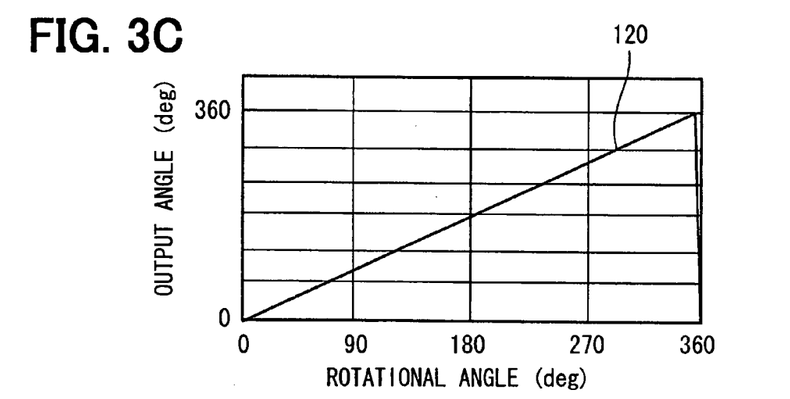
FIG. 3C is a diagram illustrating the method of detecting the rotational angle by the rotational angle detector.
Figure 4:
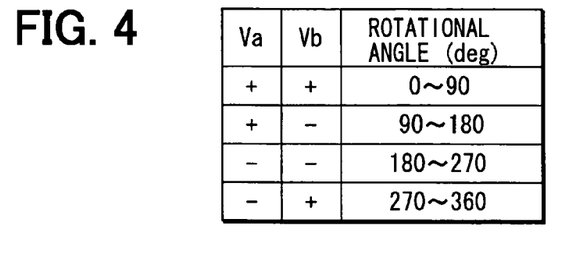
FIG. 4 is a table illustrating the method of detecting the rotational angle by the rotational angle detector.

Then, the ECU 82 determines plus or minus signs of $V_a$, $V_b$ as shown in FIG. 4 to identify a rotational angular position of the crankshaft within the 360-degree (0° to 360°) range. Based on the identified rotational angular position of the crankshaft, the ECU 82 detects a rotational angle 120 (FIG. 3C) by adding an offset angle to the calculated angle 110.

Nevertheless, since the magnetic field actually varies according to the rotation of the crankshaft, inductive noise overlaps with the output signal 100 from the Hall element 30 and the output signal 101 from the Hall element 31, so that a detection error in the rotational angle detector 1 increases. By comparing the rotational angle detector 1 with a conventional rotational angle detector, measures against the inductive noise, which are taken in the rotational angle detector 1 according to the first embodiment, will be described below.

Figure 8:
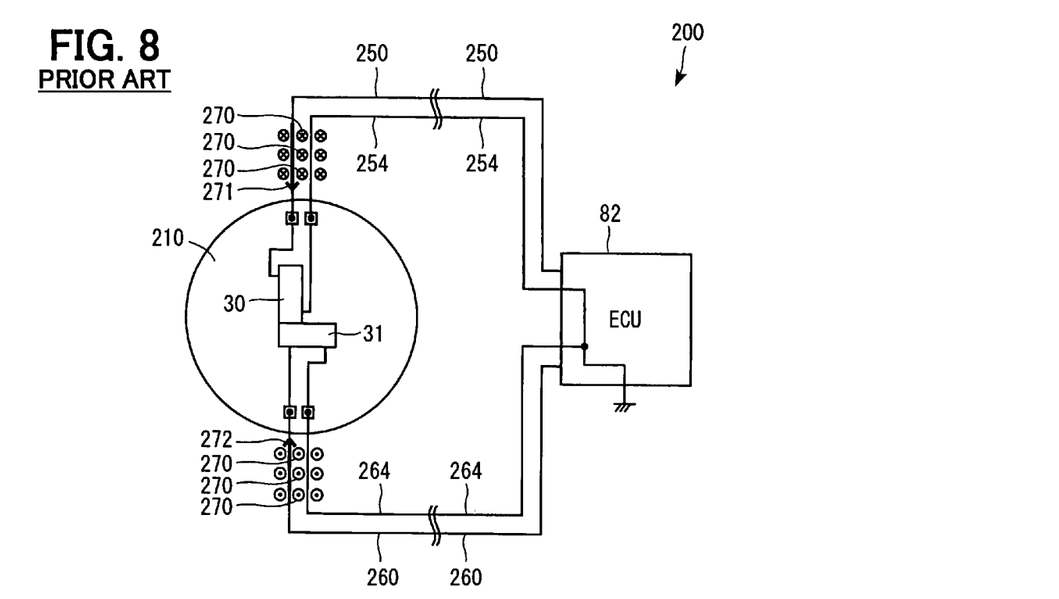
FIG. 8 is a schematic view showing a rotational angle detector according to a first conventional art.

Each component of a rotational angle detector 200 in FIG. 8 as the first conventional rotational angle detector is substantially the same as a corresponding one of the components of the rotational angle detector 1 except for a component that corresponds to the FPC 40 of the rotational angle detector 1.

The Hall elements 30, 31 are mounted on a printed circuit board 210, which is fixed on a base. The Hall element 30 is connected to the ECU 82 via conductive wires 250, 254, which run generally parallel to each other. The Hall element 31 is connected to the ECU 82 via conductive wires 260, 264, which run generally parallel to each other.

When the magnetic field varies according to the rotation of the crankshaft, a magnetic flux flowing through a circuit that is formed by the conductive wires 250, 254 varies, so that induced electromotive force is generated in the circuit formed by the conductive wires 250, 254. More specifically, when a magnetic flux 270 flowing from the upper side of the sheet of paper to behind the sheet (as shown by ⊗ in FIG. 8) increases, for example, the induced electromotive force (as indicated by an arrow 271) is generated in the circuit formed by the conductive wires 250, 254.

Given the length (a) of the conductive wires 250 and 254, a distance (b) between the conductive wires 250 and 254, the magnetic flux density (B) of the magnetic field formed by the permanent magnets 22, 24, and an angular speed (ω) of the rotation of the crankshaft, induced electromotive force ($V_e$) is expressed in the following equation (5). Likewise, the induced electromotive force (as indicated by an arrow 272) is generated in a circuit that is formed by the conductive wires 260, 264 as a result of a change in the magnetic field according to the rotation of the crankshaft.

$$V_e = \omega abB \sin\theta \quad (5)$$

Figure 9:
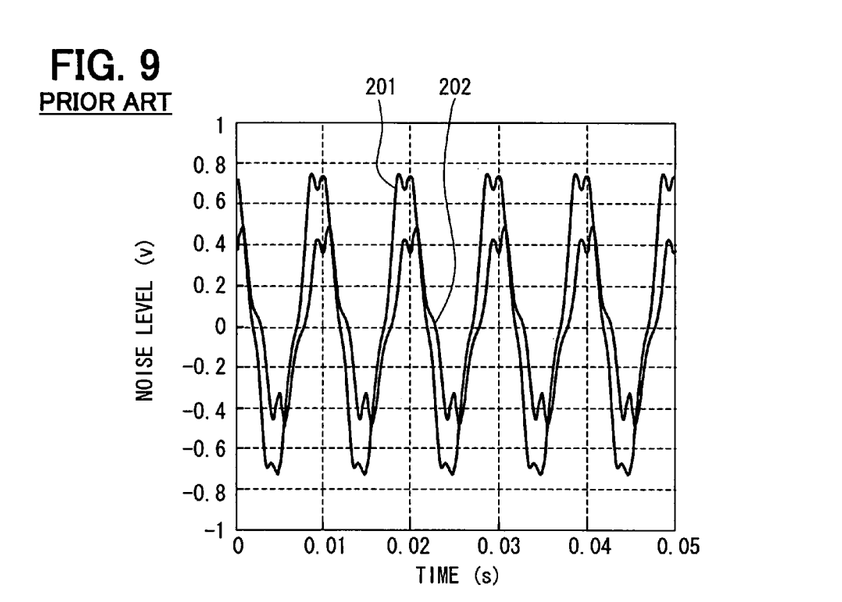
FIG. 9 is a diagram showing a result of a noise test that is performed on the rotational angle detector according to the first conventional art.

In a graph of FIG. 9, an x-axis expresses time, and a Y-axis expresses a value after a voltage, which represents the noise that overlaps with an output signal of the rotational angle detector 200, is multiplied by four hundred. The noise in the graph is measured under the conditions in which the angular speed (ω) of the rotation of the crankshaft is approximately 200 π [rad/s], and the magnetic flux density (B) of the magnetic field formed by the permanent magnets 22, 24 is approximately 80 [mT].

According to the graph, noise 201 of approximately 3.7 [mV] and noise 202 of approximately 2.3 [mV] overlap with an output signal that is transmitted via the conductive wires 250, 254 and an output signal that is transmitted via the conductive wires 260, 264, respectively. A ratio of the noise of 3.7 [mV] to the output signal with its amplitude of 5 [V] corresponds to a rotational angle (of the crankshaft) of 0.266 degrees within the 360-degree range. Similarly, a ratio of the noise of 2.3 [mV] to the output signal with its amplitude of 5 [V] corresponds to a rotational angle (of the crankshaft) of 0.166 degrees within the 360-degree range. In this manner, the detection error in the rotational angle detector 200 increases due to the inductive noise that overlaps with the output signals.

To counter against the inductive noise, the induced electromotive force that is generated in the circuit formed by the conductive wires 250, 254 can be reduced by, for example, reducing the length (a) of the conductive wires 250, 254 or the distance (b) between the conductive wires 250, 254 (See the equation (5)). That is, the induced electromotive force can be reduced by reducing an area (ab) of a loop formed by the conductive wires 250, 254. However, it has structural or manufacturing limitations to reduce the length of the conductive wires or the distance between the conductive wires. Furthermore, even if the above measures are taken, the induced electromotive force generated in the circuit formed by the conductive wires increases, and thus the detection error in the rotational angle detector increases when the angular speed of the rotation of the crankshaft increases.

Figure 10:
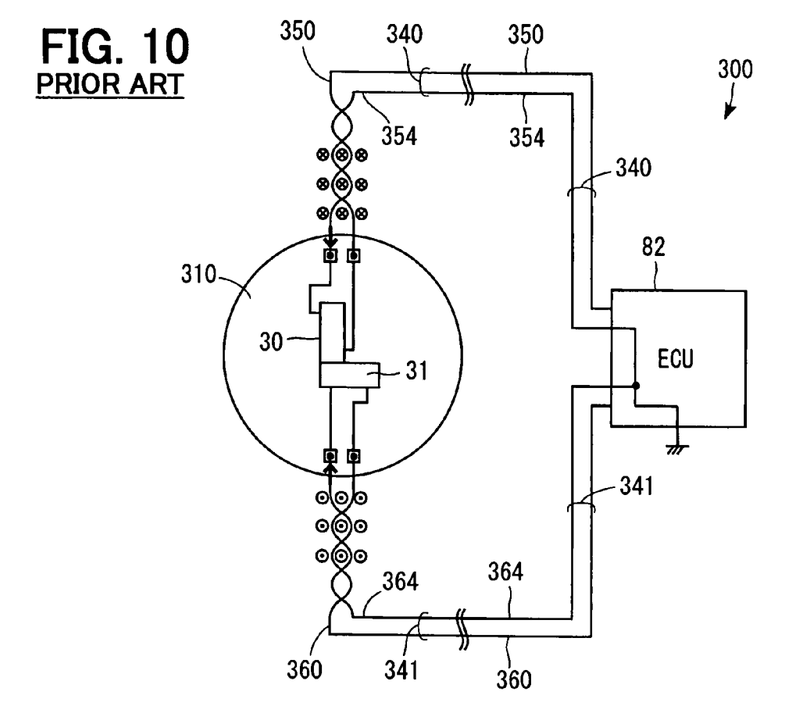
FIG. 10 is a schematic view showing a rotational angle detector according to a second conventional art.

Each component of a rotational angle detector 300 in FIG. 10 as the second conventional rotational angle detector is substantially the same as a corresponding one of the components of the rotational angle detector 1 except for the component that corresponds to the FPC 40 of the rotational angle detector 1.

The Hall elements 30, 31 are mounted on a printed circuit board 310, which is fixed on a base. The Hall elements 30, 31 are connected to the ECU 82 via respective twist pair cables. A twist pair cable 340 includes conductive wires 350, 354, which are stranded together. As well, a twist pair cable 341 includes conductive wires 360, 364, which are stranded together.

Figure 11:
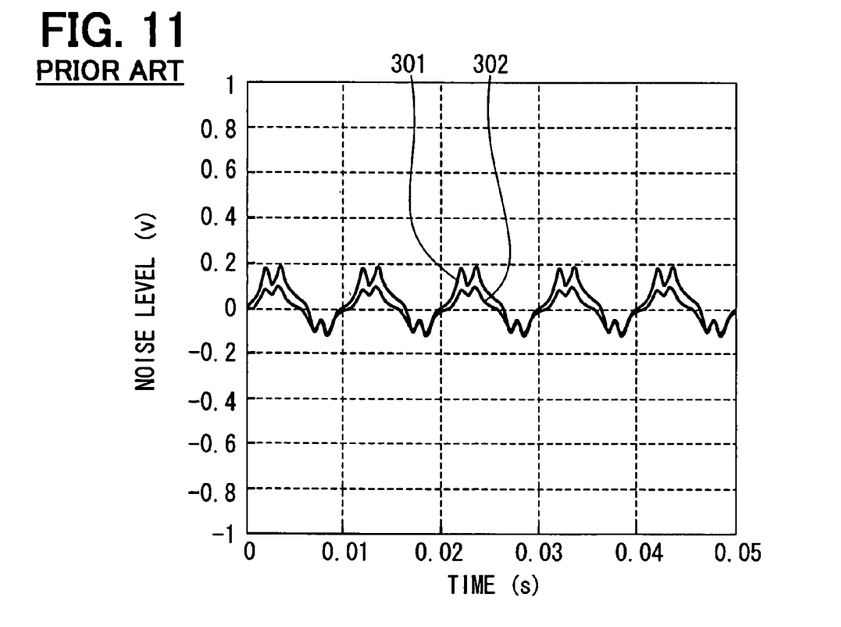
FIG. 11 is a diagram showing a result of a noise test that is performed on the rotational angle detector according to the second conventional art.

In a graph of FIG. 11, measurement results of noise that overlaps with an output signal of the rotational angle detector 300 are obtained under the same conditions as those in which the noise (FIG. 9) that overlaps with an output signal of the rotational angle detector 200 is measured.

According to the graph, noise 301, 302 of approximately 0.7 [mV] overlap with an output signal that is transmitted via the conductive wires 350, 354 and an output signal that is transmitted via the conductive wires 360, 364, respectively. As can be seen from the graph, the employment of the twist pair cables in transmitting the output signals allows reducing the inductive noise that overlaps with the output signals.

However, a ratio of the noise of 0.7 [mV] to the output signal with its amplitude of 5 [V] corresponds to a rotational angle (of the crankshaft) of 0.050 degrees within the 360-degree range. Hence, the rotational angle of the crankshaft cannot be detected with more than 0.050-degree accuracy by the rotational angle detector 300.

Figure 5:
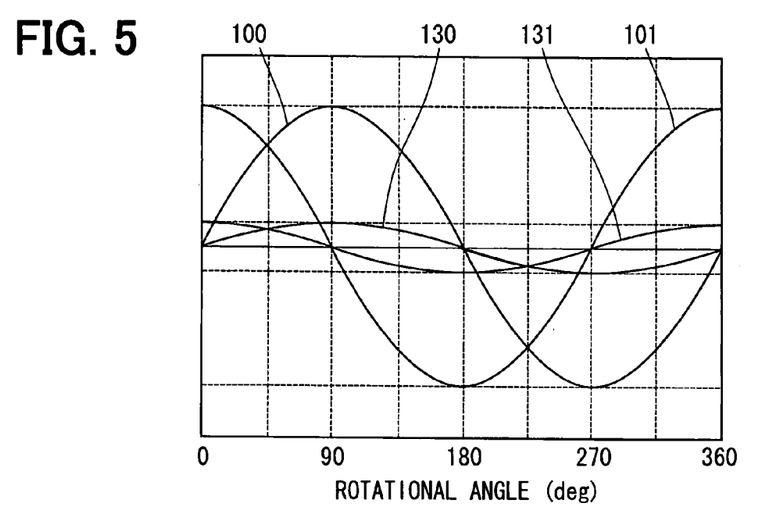
FIG. 5 is a diagram illustrating measures against noise according to the first embodiment.
Figure 6:
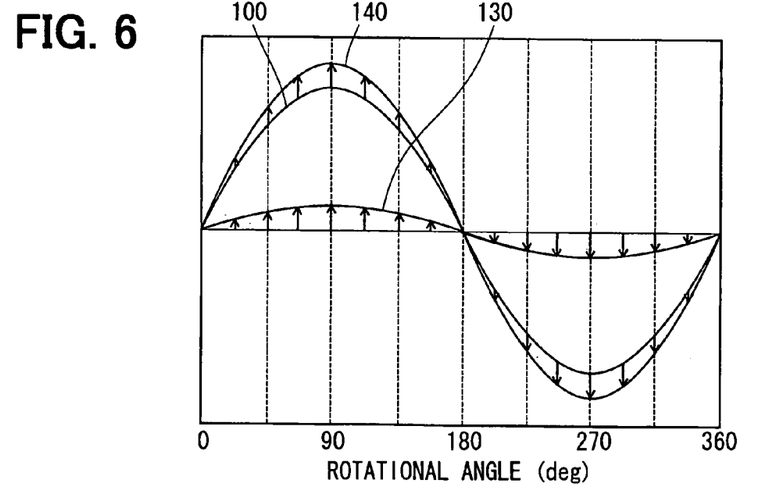
FIG. 6 is a diagram illustrating the measures against the noise according to the first embodiment.

The measures against the noise, which are taken in the rotational angle detector 1 according to the first embodiment, will be described below. FIG. 5 illustrates the noise that overlaps with the Hall element 30. FIG. 6 illustrates the output signal 100 from the Hall element 30, which the noise overlaps with.

As above, in the rotational angle detector 1, the extracting part 51 of the conductive wire 50 and the extracting part 55 of the conductive wire 54 run in the virtual plane that is generally parallel to the direction of the magnetic field. Thus, there are hardly any magnetic fluxes flowing between the extracting parts 51, 55. As a result, at the extracting parts 51, 55, very little inductive noise overlaps with the output signal 100 from the Hall element 30.

Furthermore, as above, the wiring part 52 of the conductive wire 50 and the wiring part 56 of the conductive wire 54 run in the virtual plane that is generally perpendicular to the direction of the sensitivity of the Hall element 30. Thus, the output signal 100 and the inductive noise that overlaps with the output signal 100 are in-phase at the wiring parts 52, 56.

In addition, the wiring parts 52, 56 extend from the respective extracting parts 51, 55, which run in the direction of the sensitivity of the Hall element 30, and run in the axial direction of the crankshaft. Hence, when the direction of the magnetic field is generally the same as that of the sensitivity of the Hall element 30, the magnetic field formed near the Hall element 30 is similar to that formed near the wiring parts 52, 56. More specifically, when the direction of the magnetic field is the direction of the sensitivity of the Hall element 30 as shown in FIG. 2B, for example, the magnetic flux flowing through the Hall element 30 flows between the wiring parts 52, 56. Accordingly, the inductive noise that overlaps with the output signal 100 at the wiring parts 52, 56 has the same waveform as the output signal 100.

Moreover, since the wiring parts 52, 56 run near the rotating crankshaft, where the parallel magnetic field with the uniform magnetic flux density is formed, the inductive noise that overlaps with the output signal 100 at the wiring parts 52, 56 takes the form of a sinusoidal wave.

For this reason, inductive noise 130 (FIG. 5) that overlaps with the conductive wires 50, 54 takes the form of the sinusoidal wave, which is the same waveform as the output signal 100. Consequently, even though the inductive noise 130 overlaps with the output signal 100, the output signal 100 remains the sinusoidal wave with the same phase, and only a seeming sensitivity of the Hall element 30 rises (FIG. 6). FIG. 6 shows an output signal 140 of the Hall element 30 as a result of the overlapping of the inductive noise 130 with the output signal 100. Likewise, even though inductive noise 131 overlaps with the output signal 101, the output signal 101 remains the sinusoidal wave with the same phase, and only a seeming sensitivity of the Hall element 31 rises.

In the rotational angle detector 1, the distance between the conductive wires 50, 54 is approximately the same as the distance between the conductive wires 60, 64. Accordingly, an area defined by the wiring parts 52, 56 in a loop formed by the conductive wires 50, 54 is approximately the same as an area defined by the wiring parts 62, 66 in a loop formed by the conductive wires 60, 64. Therefore, an amplitude of the inductive noise 130 that overlaps with the output signal 100 at the wiring parts 52, 56 is approximately the same as an amplitude of the inductive noise 131 that overlaps with the output signal 101 at the wiring parts 62, 66. As a result, even though the inductive noise 130 and 131 overlap with the respective output signals 100, 101, only seeming sensitivities of the Hall elements 30, 31, respectively, rise to the same extent. Thus, based on the above trigonometric function, the rotational angle of the crankshaft can be readily detected with a small detection error from the output signals 100, 101, which the respective inductive noise 130 and 131 overlap with.

Second Embodiment

Figure 7A:
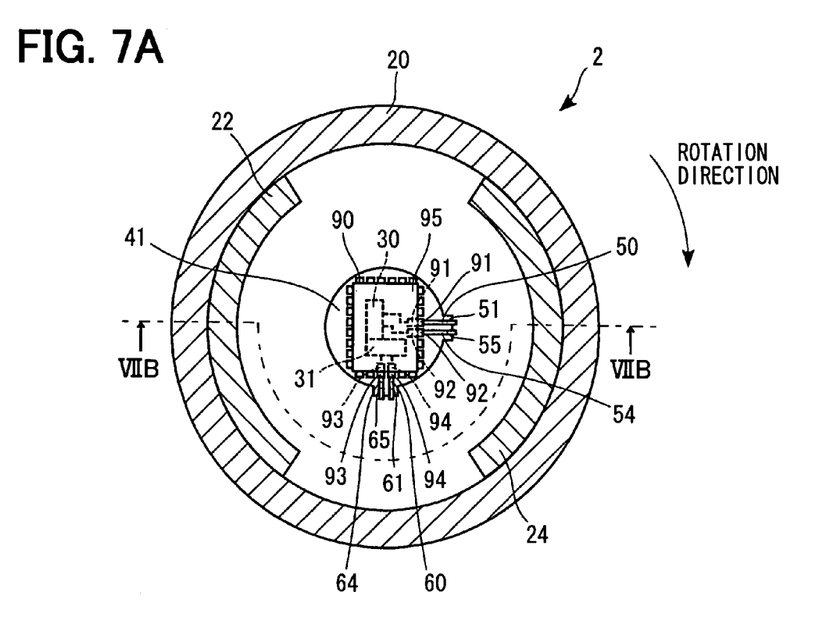
FIG. 7A is a cross-sectional view of a rotational angle detector in FIG. 7B taken along a line VIIA-VIIA according to a second embodiment of the present invention.
Figure 7B:
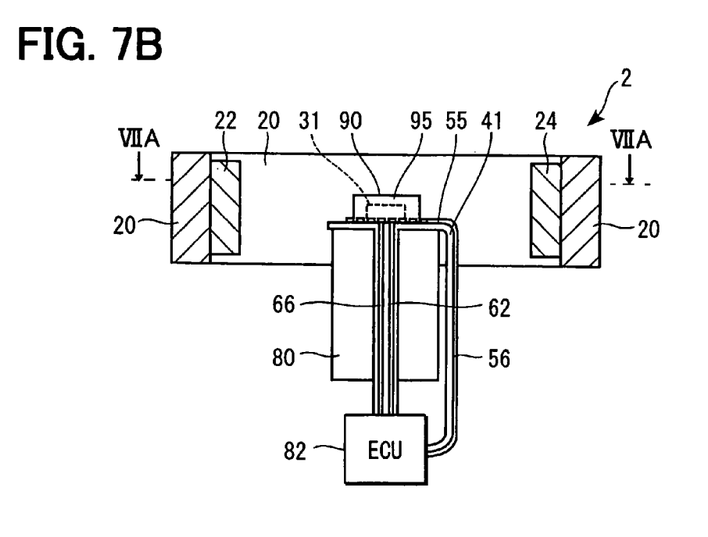
FIG. 7B is a cross-sectional view of the rotational angle detector in FIG. 7A taken along a line VIIB-VIIB according to the second embodiment.

With reference to FIGS. 7A and 7B, a rotational angle detector according to a second embodiment will be described below.

A yoke, permanent magnets, a base, and an ECU in a rotational angle detector 2 according to a second embodiment are substantially the same as corresponding components in the rotational angle detector 1 according to the first embodiment. A description of the rotational angle detector 2 will be provided below, using the same numerals as these corresponding components for referring to such components in the rotational angle detector 2.

An integrated circuit 90 includes the Hall elements 30 and 31, a plurality of leads, a package 95, and the like. The integrated circuit 90 is mounted on an FPC 41. Similar to the first embodiment, the Hall elements 30, 31 are disposed in the package 95 perpendicular to the rotational direction of the crankshaft and at right angles to each other.

Leads 91, 92 are connected to the Hall elements 30 in the package 95, and extend to the outside of the package 95. Parts (i.e., terminals) of the leads 91, 92 that are outside the package 95 are disposed in the direction of the sensitivity of the Hall element 30. Similarly, leads 93, 94 are connected to the Hall element 31, and parts (i.e., terminals) of the leads 93, 94 that are outside the package 95 are disposed in the direction of the sensitivity of the Hall element 31. The extracting parts 51, 55, 65, 61 are connected to the leads 91, 92, 93, 94, respectively.

The FPC 41 is substantially the same as the FPC 40 according to the first embodiment except for a pad on which the integrated circuit 90 is mounted.

In the rotational angle detector 2, since the parts of the leads 91, 92 that are outside the package 95 are disposed in the direction of the sensitivity of the Hall element 30, the wiring of the conductive wires 50, 54 can be readily carried out, such that the respective extracting parts 51, 55 extend toward the direction of the sensitivity of the Hall element 30. Similarly, because the parts of the leads 94, 93 that are outside the package 95 are disposed in the direction of the sensitivity of the Hall element 31, the wiring of the conductive wires 60, 64 can be readily carried out, such that the respective extracting parts 61, 65 extend toward the direction of the sensitivity of the Hall element 31.

Other Embodiments

In the embodiments described thus far, the rotational angle detectors with the two Hall elements 30, 31 as the magnetism detecting elements have been described. Nevertheless, the rotational angle detector may include one magnetism detecting element or more than two magnetism detecting elements. Magnetoresistive elements, such as an anisotropic magnetoresistive element and a large magnetoresistive element, may be employed for the magnetism detecting element.

Furthermore, although it has been described that the Hall elements 30, 31 are disposed perpendicular to the rotational direction of the crankshaft and at right angles to each other, the Hall elements 30, 31 may be disposed to make a predetermined angle other than 90 degrees.

A method of placing the Hall elements 30, 31 on the base 80 is not limited to the method whereby they are mounted on the FPC 40, which is fixed on the base 80. More specifically, the Hall elements 30, 31 may be mounted on, for example, a printed circuit board that is fixed on the base 80, or the FPC 40 via a printed circuit board. Additionally, the Hall elements 30, 31 may be driven at a constant voltage.

It has been described that the conductive wires 50, 54, 60, 64 are formed on the FPC 40. However, a cable that is formed on a board other than the FPC 40, or a lead that is formed by die-cutting of a thin plate of metal or etching may be employed for the conductive wire.

Besides, as long as the detection error falls within certain specifications, the conductive wires 50, 54 do not need to run parallel to each other, or to extend toward the direction of the sensitivity of the Hall element 30. As well, the conductive wires 60, 64 do not need to run parallel to each other, or to extend toward the direction of the sensitivity of the Hall element 31. Moreover, the distance between the conductive wires 50, 54 may be different from the distance between the conductive wires 60, 64. In addition, the conductive wires 50, 54, 60, 64 do not need to run near the rotating crankshaft, or to include their extracting parts. In addition, although it has been described that the magnetic field generating means rotates relative to the magnetism detecting element, the magnetism detecting element may rotate relative to the magnetic field generating means.

In the second embodiment, while the integrated circuit 90 of a quad flat package (QFP) is described, the Hall elements 30, 31 may be formed on an integrated circuit other than the QFP.

Furthermore, the present invention is not by any means limited to the above embodiments, and it can be applied to various embodiments without departing from the scope of the present invention.

What is claimed is:

1. A rotational angle detector for detecting rotation of a detection object comprising:
    a magnetic field generating means for generating a magnetic field;
    a magnetism detecting element positioned in the magnetic field for outputting an output signal in correspondence with variation in the magnetic field caused by rotation of the detection object;
    a pair of conductive wires that are connected to the magnetism detecting element for transmitting the output signal; and
    an electronic means for detecting a rotational angle of the detection object based on the output signal, wherein:
        the pair of conductive wires includes a corresponding pair of wiring parts, which run in a virtual plane that is generally perpendicular to a direction of a sensitivity of the magnetism detecting element and extend along a rotational axis of the detection object in an area where the magnetic field is varied by the rotation of the detection object.

2. The rotational angle detector according to claim 1, wherein the pair of conductive wires includes a corresponding pair of extracting parts, wherein:
    the pair of extracting parts runs along a surface of the base, on which the magnetism detecting element is positioned; and
    the pair of extracting parts extends to the corresponding pair of wiring parts.

3. The rotational angle detector according to claim 2, wherein each one of the pair of extracting parts runs in a virtual plane that is generally parallel to a direction of the magnetic field.

4. The rotational angle detector according to claim 2, wherein each one of the pair of extracting parts extends in the direction of the sensitivity of the magnetism detecting element.

5. The rotational angle detector according to claim 4, further comprising a pair of terminals that are disposed in the direction of the sensitivity of the magnetism detecting element, wherein the pair of conductive wires is connected to the magnetism detecting element via the corresponding pair of terminals.

6. The rotational angle detector according to claim 1, wherein:
    the magnetism detecting element is one of a plurality of magnetism detecting elements;
    the pair of conductive wires is one pair of a plurality of pairs of conductive wires, wherein each one pair of the plurality of pairs of conductive wires is connected to a corresponding one of the plurality of magnetism detecting elements;
    the pair of wiring parts is one pair of a plurality of pairs of wiring parts;
    the pair of extracting parts is one pair of a plurality of pairs of extracting parts, wherein each one pair of the plurality of pairs of conductive wires includes a corresponding pair of the plurality of pairs of wiring parts, and a corresponding pair of the plurality of pairs of extracting parts; and
    a distance between any one pair of the plurality of pairs of wiring parts, which are connected to a corresponding one of the plurality of magnetism detecting elements, is approximately the same.

7. The rotational angle detector according to claim 1, wherein:
    the magnetic field generating means generates a generally parallel magnetic field near the rotational axis of the detection object;
    the magnetism detecting element is positioned near the rotational axis of the detection object; and
    the pair of conductive wires runs near the rotational axis of the detection object.

* * * * *